(12) United States Patent
Sahni (10) Patent No.: US 10,917,190 B2
(45) Date of Patent: Feb. 9, 2021

(54) METHOD AND SYSTEM FOR CWDM MUX/DEMUX DESIGNS FOR SILICON PHOTONICS INTERPOSERS

(71) Applicant: Luxtera LLC., Wilmington, DE (US)

(72) Inventor: Subal Sahni, La Jolla, CA (US)

(73) Assignee: Luxtera LLC, Wilmington, DE (US)

( * ) Notice: Subject to any disclaimer, the term of this patent is extended or adjusted under 35 U.S.C. 154(b) by 0 days.

(21) Appl. No.: 16/599,698

(22) Filed: Oct. 11, 2019

(65) Prior Publication Data

US 2020/0119828 A1 Apr. 16, 2020

Related U.S. Application Data

(60) Provisional application No. 62/744,591, filed on Oct. 11, 2018.

(51) Int. Cl.
| | |
|---|---|
| *H04J 14/02* | (2006.01) |
| *G02B 6/42* | (2006.01) |
| *H04B 10/40* | (2013.01) |
| *G02B 6/293* | (2006.01) |
| *G02B 6/27* | (2006.01) |
| *H04B 10/50* | (2013.01) |
| *H04B 10/60* | (2013.01) |

(52) U.S. Cl.
CPC ............ *H04J 14/02* (2013.01); *G02B 6/272* (2013.01); *G02B 6/2938* (2013.01); *G02B 6/4246* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | |
|---|---|---|
| 2001/0048556 A1 | 12/2001 | Ranalli et al. |
| 2002/0064191 A1 | 5/2002 | Capewell et al. |

(Continued)

OTHER PUBLICATIONS

International PCT Application No. PCT/US2019/055902, Notification of Transmittal Of The International Search Report And The Written Opinion Of The International Searching Authority, or the Declaration, dated Dec. 31, 2019.

*Primary Examiner* — Darren E Wolf
(74) *Attorney, Agent, or Firm* — Patterson + Sheridan, LLP (57) ABSTRACT

Methods and systems for CWDM MUX/DEMUX designs for silicon photonics interposers are disclosed and may include an optical transceiver including a silicon photonics interposer, a polarization splitter, a lens array, and a prism with a coarse wavelength division multiplexing (CWDM) coating and a high reflectivity (HR) coating. The polarization splitter, lens array, and prism are coupled to the silicon photonics interposer. An input optical signal of a plurality of different wavelengths and polarizations may be received. Signals of different polarization may be spatially separated using the polarization splitter and signals of a first wavelength range may be reflected into the lens array using the CWDM coating while signals in a second wavelength range may be passed through. Signals of the second wavelength range may be reflected to the lens array using the HR coating, and optical signals may be coupled into the silicon photonics interposer using the lens array.

22 Claims, 11 Drawing Sheets

(56) References Cited

U.S. PATENT DOCUMENTS

| | | | |
|---|---|---|---|
| 2004/0042736 A1* | 3/2004 | Capewell | G02B 6/4215 |
| | | | 385/89 |
| 2012/0263416 A1 | 10/2012 | Morioka | |
| 2015/0037044 A1 | 2/2015 | Peterson et al. | |
| 2016/0191192 A1* | 6/2016 | Yue | G02B 6/2938 |
| | | | 398/83 |
| 2016/0301191 A1* | 10/2016 | Orcutt | H01S 5/141 |

* cited by examiner

METHOD AND SYSTEM FOR CWDM MUX/DEMUX DESIGNS FOR SILICON PHOTONICS INTERPOSERS

CROSS-REFERENCE TO RELATED APPLICATIONS/INCORPORATION BY REFERENCE

This application claims priority to and the benefit of U.S. Provisional Application No. 62/744,591 filed on Oct. 11, 2018, which is hereby incorporated herein by reference in its entirety.

FIELD

Aspects of the present disclosure relate to electronic components. More specifically, certain implementations of the present disclosure relate to methods and systems for CWDM MUX/DEMUX designs for silicon photonics interposers.

BACKGROUND

Conventional approaches for multiplexing and demultiplexing may be costly, cumbersome, and/or inefficient—e.g., they may be complex and/or time consuming, and/or may have limited responsivity due to losses.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for CWDM MUX/DEMUX designs for silicon photonics interposers, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
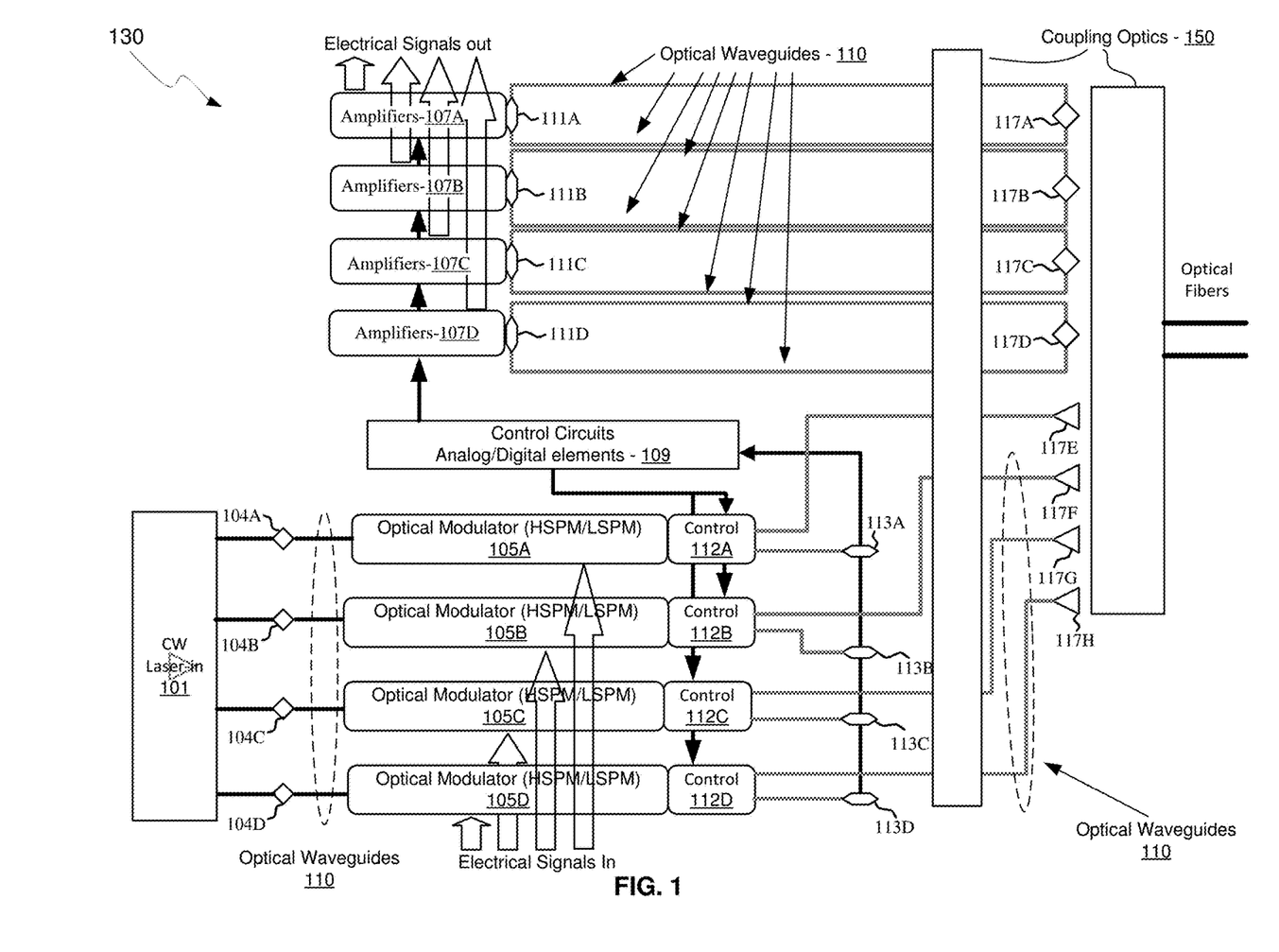
FIG. 1 is a block diagram of a photonically-enabled integrated circuit with polarization independent MUX/DEMUX, in accordance with an example embodiment of the disclosure.

FIG. 1 is a block diagram of a photonically-enabled integrated circuit with course wavelength division multiplexing ("CWDM") multiplexer/demultiplexer ("MUX/DEMUX") designs for silicon photonics interposers, in accordance with an example embodiment of the disclosure. Referring to FIG. 1, there are shown optoelectronic devices of a photonically-enabled integrated circuit 130 comprising optical modulators 105A-105D, photodiodes 111A-111D, monitor photodiodes 113A-113D, and optical devices comprising couplers 103A-103C and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example. Coupling optics 150 may comprise beam splitters, thin film filters, mirrors, prisms, etc., and may be integrated on the interposer as wells as external to the interposer.

In an example scenario, the photonically-enabled integrated circuit 130 comprises one or more complementary metal-oxide semiconductor (CMOS) electronics die coupled to a CMOS photonics interposer die with a laser assembly 101 also coupled to the top surface of the interposer. The laser assembly 101 may comprise one or more semiconductor lasers with isolators, lenses, and/or rotators for directing one or more continuous-wave (CW) optical signals to the couplers 104A-104D. The CW optical signals may be at different wavelengths for CWDM operation, such as CWDM4, for example. The photonically enabled integrated circuit 130 may be integrated on a plurality of die, such as with one or more electronics die and one or more photonics die.

The grating couplers 104A-104D comprise grating structures with grating spacing and width configured to couple optical signals of a specific wavelength and polarization into the IC 130. A lens array may be incorporated between the grating couplers 104A-104D and the laser assembly 101 for focusing of the optical signal to the grating couplers for increased coupling efficiency.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode. Such one mode may have, for example, a polarization that is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

The optical modulators 105A-105D comprise Mach-Zehnder or ring modulators, for example, and enable the modulation of the continuous-wave (CW) laser input signals. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the high-speed optical phase modulators may operate based on the free carrier dispersion effect and may demonstrate a high overlap between the free carrier modulation region and the optical mode. High-speed phase modulation of an optical mode propagating in a waveguide is the building block of several types of signal encoding used for high data rate optical communications. Speed in the tens of Gb/s may be used to sustain the high data rates used in modern optical links and can be achieved in integrated Si photonics by modulating the depletion region of a PN junction placed across the waveguide carrying the optical beam. In order to increase the modulation efficiency and minimize the loss, the overlap between the optical mode and the depletion region of the PN junction is carefully optimized.

One output of each of the optical modulators 105A-105D may be optically coupled via the waveguides 110 to the grating couplers 117E-117H. The other outputs of the optical modulators 105A-105D may be optically coupled to monitor photodiodes 113A-113D to provide a feedback path. The IC 130 may utilize waveguide based optical modulation and receiving functions. Accordingly, the receiver may employ an integrated waveguide photo-detector (PD), which may be implemented with epitaxial germanium/SiGe films deposited directly on silicon, for example.

The grating couplers 104A-104D and 117A-117H may comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 104A-104D and 117A-117H may comprise single polarization grating couplers (SPGC) and/or polarization splitting grating couplers (PSGC). In instances where a PSGC is utilized, two input, or output, waveguides may be utilized, as shown for grating couplers 117A-117D, although these may instead be SPGCs.

The optical fibers may be epoxied, for example, to the CMOS interposer, using a fiber coupler that selectively deflects optical signals of different wavelengths to and from different grating couplers on the photonically-enabled integrated circuit 130, with each coupler, such as each of the grating couplers 117A-117H being configured to couple optical signals of different wavelengths.

The photodiodes 111A-111D may convert optical signals received from the grating couplers 117A-117D into electrical signals that are communicated to the amplifiers 107A-107D for processing. In another embodiment of the disclosure, the photodiodes 111A-111D may comprise high-speed heterojunction phototransistors, for example, and may comprise germanium (Ge) in the collector and base regions for absorption in the 1.3-1.6 μm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enables modulation of the CW laser signal received from the grating couplers 104A-104D. The optical modulators 105A-105D may require high-speed electrical signals to modulate the refractive index in respective branches of a Mach-Zehnder interferometer (MZI), for example.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

Integrated photonics platforms allow the full functionality of an optical transceiver to be integrated on a single chip or a plurality of chips in a flip-chip bonded structure. An optical transceiver contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths.

An important commercial application of silicon photonics is high speed optical transceivers, i.e., ICs that have optoelectronic transmission (Tx) and receiving (Rx) functionality integrated in the same chip or a plurality of bonded chips in a small package. The input to such an IC or ICs is either a high speed electrical data-stream that is encoded onto the Tx outputs of the chip by modulating the light from a laser or an optical data-stream that is received by integrated photo-detectors and converted into a suitable electrical signal by going through a Trans-impedance Amplifier (TIA)/Limiting Amplifier (LA) chain. Such silicon photonics transceiver links have been successfully implemented at baud-rates in the tens of GHz.

One method for increasing data rates in optical transceivers is to multiplex a plurality of optical signals at different wavelengths for concurrent transmission through the optical fiber, which may then be demultiplexed at the receiving end. To this end, multiplexers and demultiplexers may be utilized to respectively combine and separate the different optical wavelengths. This may be accomplished with thin film filters (TFFs) tuned to different wavelengths, deflecting optical signals down to near-normal incidence on the chip into corresponding grating couplers while allowing other wavelength signals to pass through. These structures are shown in FIG. 1 as coupling optics 150 and in further detail with respect to FIGS. 2-11.

Figure 2:
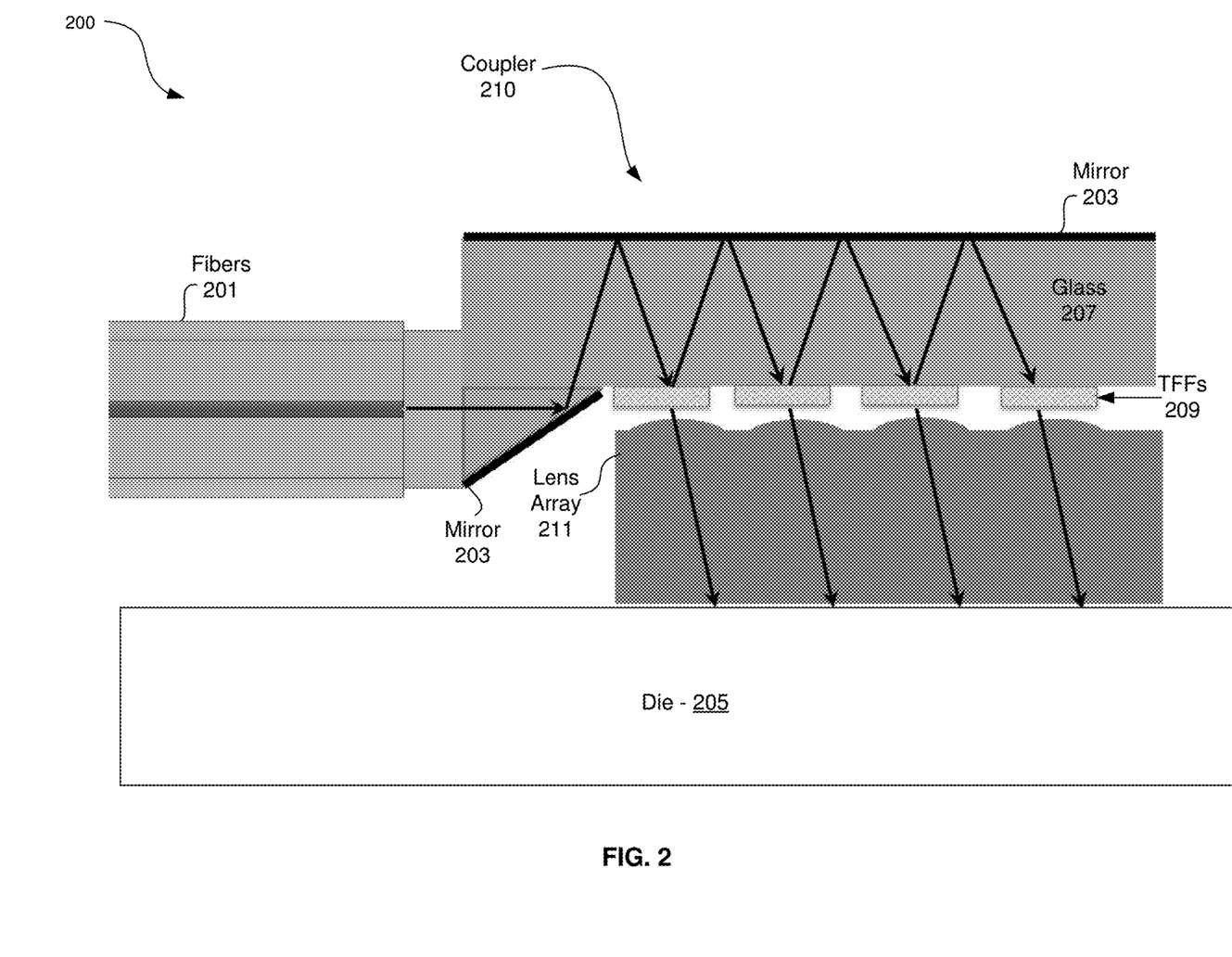
FIG. 2 is a schematic illustrating a MUX/DEMUX with thin film filters, in accordance with an example embodiment of the disclosure.

FIG. 2 is a schematic illustrating thin film filters with a launching filter, in accordance with an embodiment of the disclosure. Referring to FIG. 2, there is shown a transceiver 200 with optical signals coupled via fibers 201 and a coupler 210. The coupler 210 comprises mirrors 203, glass 207, thin film filters (TFFs) 209, and a lens array 211. The coupler 210 may be configured to direct optical signals into photonics interposer die 205 at near-normal incidence.

The fibers 201 may comprise one or more optical fibers for coupling optical signals to and from the coupler 210 and photonics die 205. The fibers may comprise single mode or multi-mode fiber. In an example scenario, one fiber is used to couple signals into the coupler 210 and subsequently to the photonics die 205, while a second fiber receives optical signals from the photonics die 205 via the coupler 210.

The glass 207 may comprise a machined and/or polished highly transparent structure on which optical components such as mirrors and filters may be formed. For example, one or more layers of a highly reflective metal, such as gold, for example, may be deposited on highly polished surfaces of the glass 207, thereby forming mirrors 203. Similarly, filter structures may be formed by depositing stacks of dielectric layers on the glass 207, thereby forming the TFFs 209, for example. Accordingly, the glass 207 may guide optical signals from the fiber 201 end to the TFF 209 end, and vice versa.

The lens array 211 may comprise a micro-machined silicon structure, for example, with lens structures formed therein that are operable to focus optical signals received from the TFFs 209 to specific spots on the photonics die 205, such as grating couplers. While convex lensing structures are shown, other shapes may be utilized depending on desired focal length, the dielectric constant of the lens material used, and space requirements, for example.

The TFFs 209 may comprise stacks of alternating dielectric constant materials resulting in structures that are reflective at most wavelengths but allow light of specific wavelengths to pass through. Each of the TFFs 209 may be tuned to different wavelengths, which may be useful for CWDM applications. While four TFFs 209 are shown in FIG. 2, any number of TFFs may be used depending on the number of desired different wavelengths.

The mirrors 203 may comprise a highly reflective material, such as a metal, formed on the glass 207, for directing the optical signals to the TFFs 209 from the fibers 201. The fibers 201 may comprise collimators at their outputs for providing collimated beams to the coupler 210.

In operation, optical signals may be coupled into the coupler 210 via the fibers 201 and reflected by the mirrors 203 and TFFs 209, resulting in a multi-reflection configuration. The TFFs 209 are each configured to reflect all signals except for those in a specific wavelength range. In this manner, specific wavelength optical signals may be coupled to specific locations on the photonics die 205, preferably to grating couplers tuned to the specific wavelength. The mirrors 203 enable a substantially vertical impingement on the TFFs 209, so that further reflecting structures are not needed after the TFFs 209 for desired near-normal incidence on the photonics die 205, thereby maximizing the coupling efficiency of optical signals in to the photonics die 205.

Figure 3:
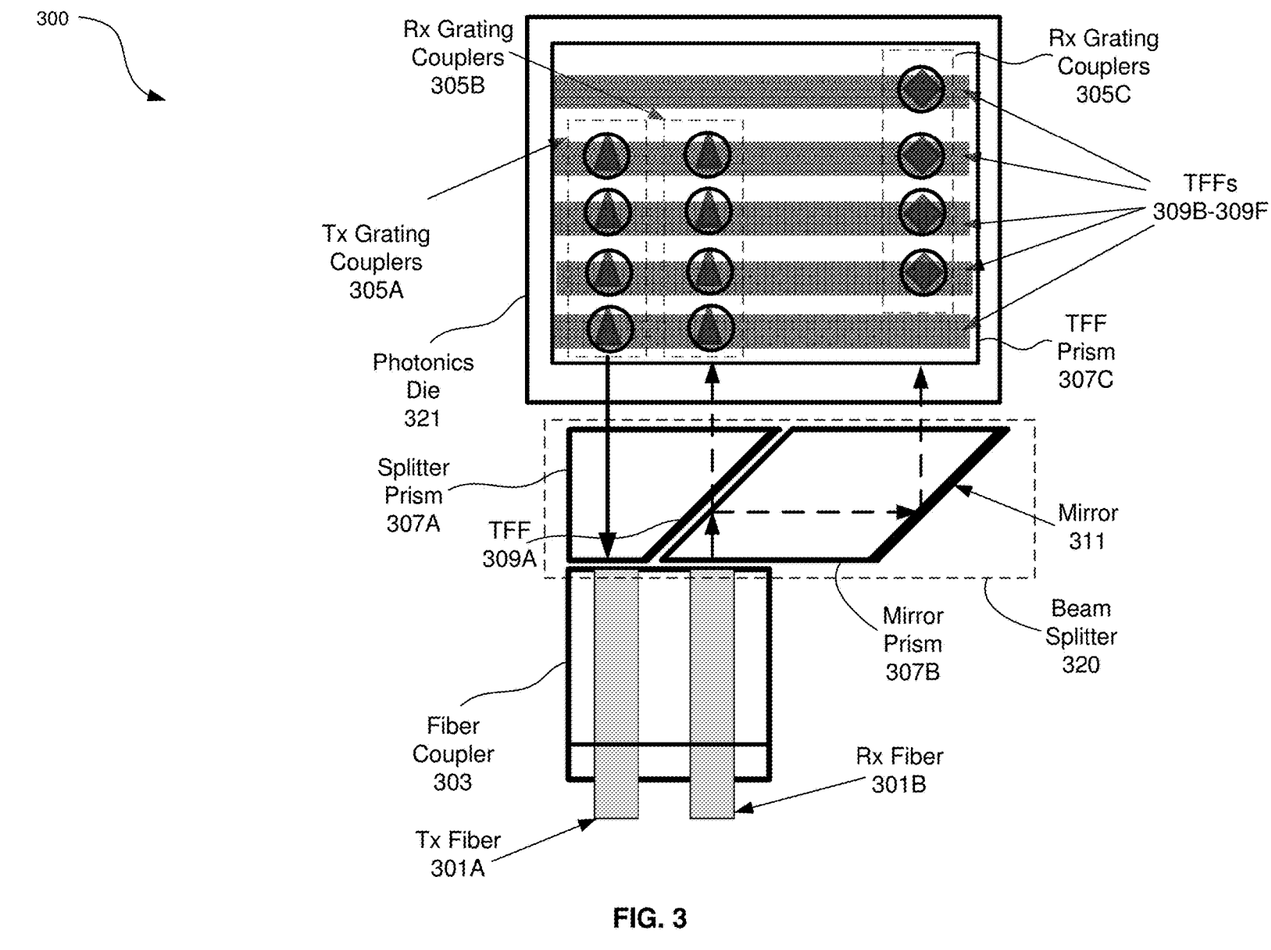
FIG. 3 illustrates an optical transceiver with a spatial separation beam splitter, in accordance with an example embodiment of the disclosure.

FIG. 3 illustrates an optical transceiver with a spatial separation beam splitter, in accordance with an example embodiment of the disclosure. Referring to FIG. 3, there is shown a transceiver 300 comprising Tx fiber 301A, Rx fiber 301B, a fiber coupler 303, a photonic die 321, and beam splitter 320. The photonic die 350 may be similar to the photonic die described earlier with respect to FIGS. 1 and 2, and may comprise the Tx grating couplers 305A and Rx grating couplers 305B and 305C. In an example scenario, the Tx couplers 305A and Rx grating couplers 305B may comprise single polarization grating couplers and the Rx grating couplers 305C may comprise polarization splitting grating couplers.

The prism 307C may comprise a transparent structure with thin film filters formed on sloped surfaces for reflecting desired signals down to the Rx grating couplers 305B and 305C as well as from the Tx grating couplers 305A to the Tx fiber 301A via the splitter prism 307A. The prism 307A may also have thin films formed on an angled surface thereby forming TFF 309A for splitting signals of different polarizations upon hitting the sloped surface, while mirror prism 307B comprises layers formed on an angled surface to provide a mirror 311 for reflecting signals from the TFF 309A to the Rx grating couplers 305C.

The transceiver 300 incorporates the beam splitter 320 comprising the TFF 309A in the splitter prism 307A and the mirror 311 in the mirror prism 307B to spatially separate signals of different polarizations, such that the different Rx grating couplers 305B and 305C may be utilized for different polarizations and wavelengths from a single received CWDM signal. In addition, the transceiver comprises a $5^{th}$ TFF for the $4^{th}$ p-polarization.

Each TFF 309B-309F may be designed to reflect the s-polarization of one CWDM band and p-polarization of the previous CWDM band while allowing others to pass through. This approach has the band-edges of the p- and s-polarization transmissions deliberately separated. In this example, the delta between them is set to 20 nm (CWDM channel spacing). The delay between the two polarizations can be readily compensated on silicon, such as with a few hundred microns of extra waveguide length on one side, for example.

In operation, the transceiver 300 is operable to receive and transmit CWDM4 signals through the use of spatially separated polarization splitters and wavelength sensitive thin film filters. Four optical signals at different CWDM wavelengths may be generated in the photonics die 321, such as described previously, and coupled out of the die via the Tx grating couplers 305A. The TFFs 309B-309F reflect each of the signals out of the TFF prism 307C into the splitter prism 307A and into the Tx fiber 301A, thereby generating a CWDM4 signal transmitted into the fiber 301A.

Similarly, a CWDM signal may be received via the Rx fiber 301B and coupled to the beam splitter 320 where one polarization passes through the TFF 309A to the TFF prism 307C, where each of the TFFs 309B-309F reflects a particular wavelength and polarization signal down to the Rx grating couplers 305B, which couple the corresponding wavelength signal into the photonic die 321 for processing. The other polarization signals at the TFF 309A are reflected laterally to the mirror 311, which reflects the signals into the TFF prism 307C, where the TFFs 309B-309F each reflect a specific wavelength and polarization signal down to the Rx grating couplers 305C, which couple the signals into the photonic die 321 for processing.

Figure 4:
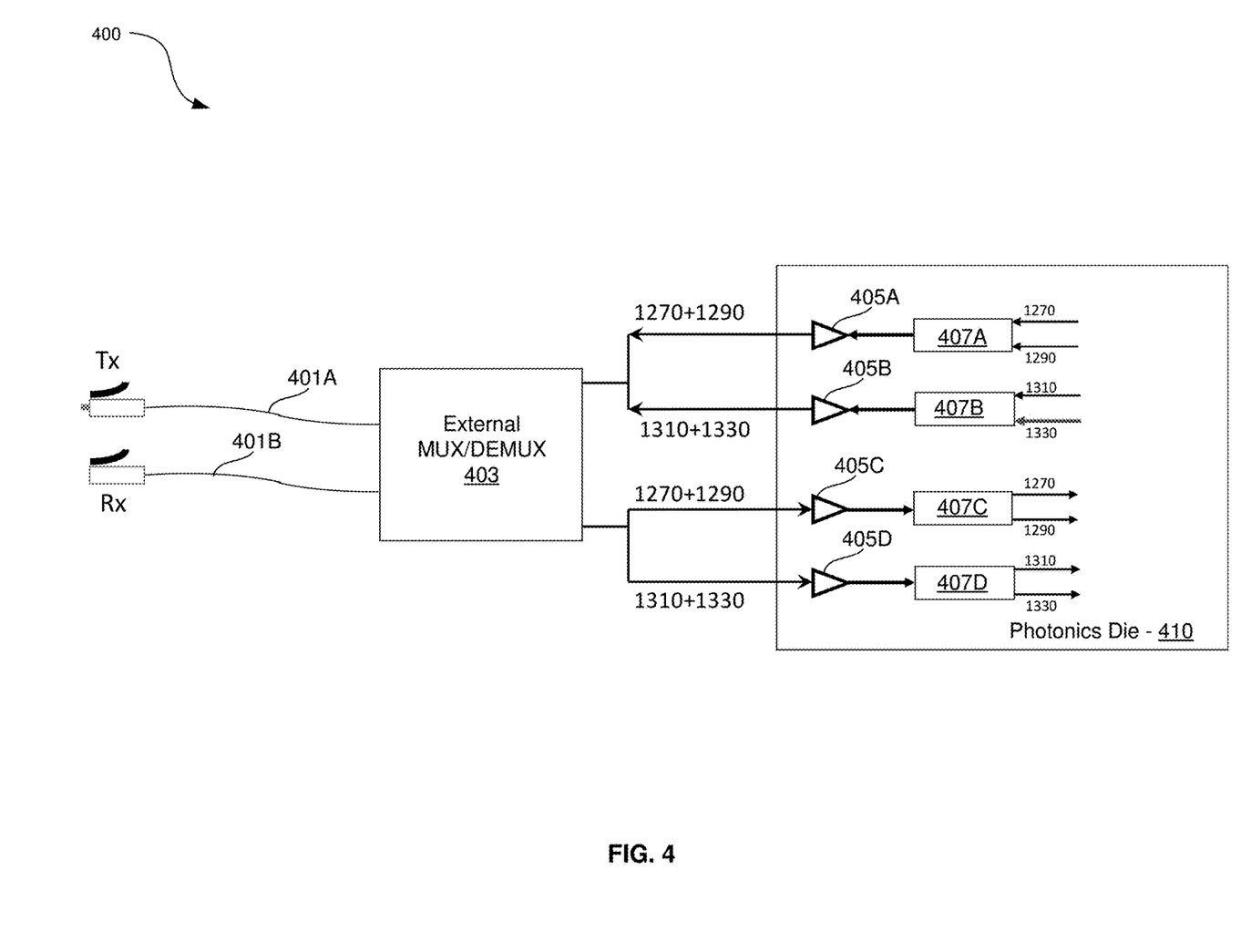
FIG. 4 illustrates an architecture with distributed MUX/DEMUX function, in accordance with an example embodiment of the disclosure.

FIG. 4 illustrates an architecture with distributed MUX/DEMUX function, in accordance with an example embodiment of the disclosure. Referring to FIG. 4, there is shown a transceiver 400 with optical fibers 401A and 401B, external MUX/DEMUX 403 and photonics die 410. The photonics die 410 may comprise an interposer with optical and optoelectronic devices, such as grating couplers 405A-405D and multiplexers/demultiplexers 407A-407D, with each coupler and MUX/DEMUX operable to communicate split an input signal into two different wavelengths and/or combine two signals into one, although the disclosure is not limited to this example.

By integrating a portion of the MUX/DEMUX function in the die 410 and a portion external to the interposer die 410, this may leverage the strengths of each platform enabling a manufacturable high density solution. The external MUX/DEMUX 403 may comprise an array of thin film filters or birefringent material, for example, for separating the input optical signal into two separate signals of two wavelengths each. The on-chip multiplexers/demultiplexers 407A-407D may comprise optical waveguides with phase modulation sections, optical couplers, and photodetectors, as described in U.S. patent application Ser. No. 15/805,803, which is hereby incorporated herein by reference in its entirety.

In the example shown in FIG. 4, four CWDM wavelengths may be transmitted and received. For example, the Rx optical fiber 401B may receive an input optical signal comprising four optical signals of different wavelength, 1270 nm, 1290 nm, 1310 nm, and 1330 nm, in this example. The external MUX/DEMUX 403 may split the received input signal and output two signals comprising two wavelengths, 1270/1290 nm and 1310/1330 nm for example. These optical signals may then be coupled into the photonics die 410 via the grating couplers 405C and 405CD. Each of these signals may then be further demultiplexed by on-chip demultiplexers 407C and 407D, resulting in four separate signals of different wavelengths.

In addition, the transceiver 400 may couple a wavelength division multiplexed signal into the Tx optical fiber 401A. Four signals of four wavelengths, such as 1270, 1290, 1310, and 1330 nm may be coupled into the MUX/DEMUX 407A and 407D, where MUX 407A multiplexes the 1270 and 1290 nm signals into a single optical signal and the MUX 407B multiplexes the 1310 and 1330 nm signals into a single signal. These two multiplexed signals may then be communicated out of the photonics die 410 via the grating couplers 405A and 405B to the external MUX/DEMUX 403. The two received signals may then be further multiplexed by the external MUX/DEMUX 403 unto a single output signal on the Tx optical fiber 401A.

Figure 5:
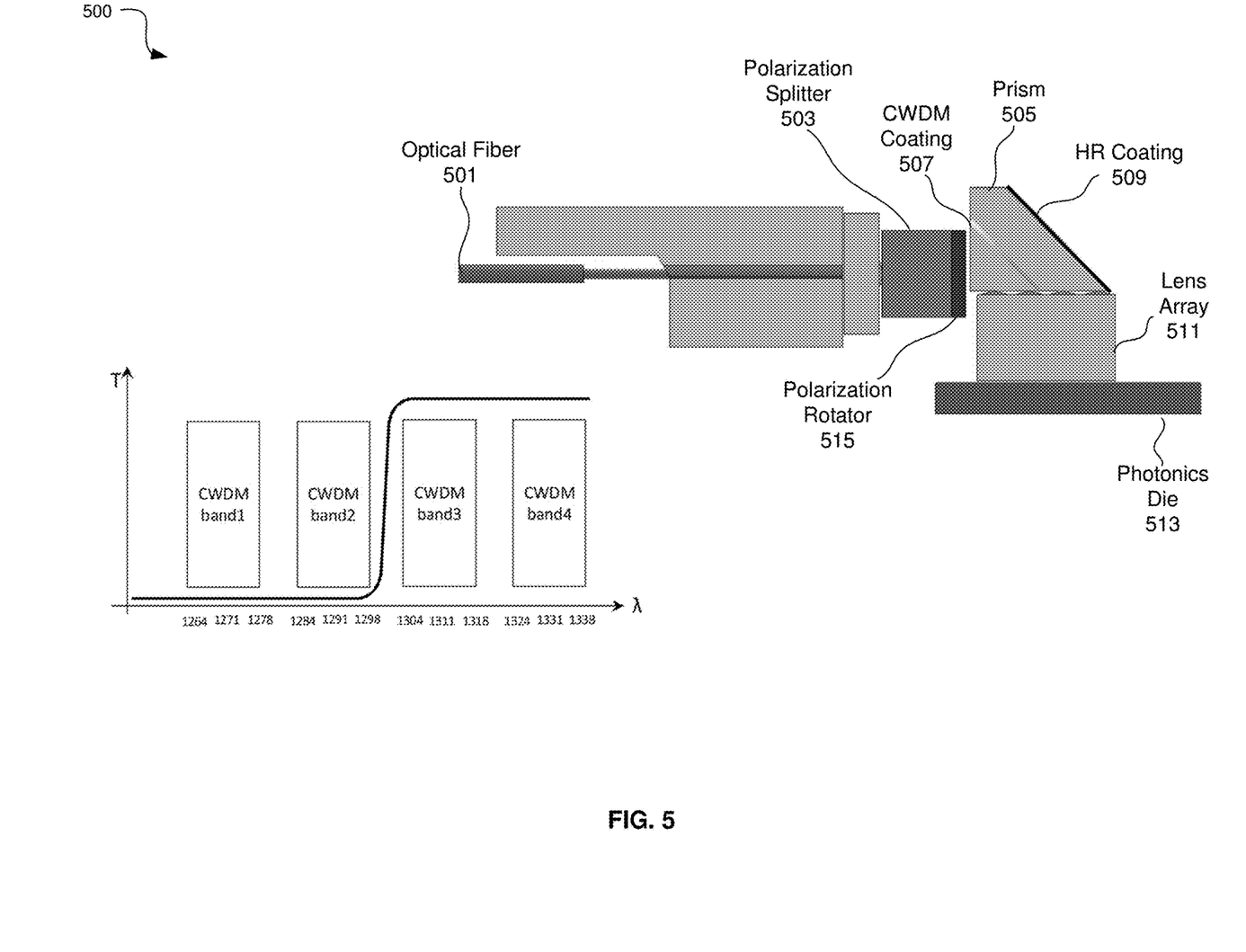
FIG. 5 illustrates details of an external multiplexer/demultiplexer, in accordance with an example embodiment of the disclosure.

FIG. 5 illustrates details of an external multiplexer/demultiplexer, in accordance with an example embodiment of the disclosure. Referring to FIG. 5, there is shown an external MUX/DEMUX 500 coupled to a photonics die 513, with an input/output fiber 501, polarization splitter 503, prism 505, lens array 511, and polarization rotator 515. The polarization splitter 503 may comprise a birefringent material or spatially separating and polarization-dependent thin film filters, for example, that may separate optical signals of different polarization spatially so that each signal may be reflected downward to corresponding grating couplers in the photonics die 513 via the CWDM coating 507 or the HR coating 509. In an example scenario, the polarization splitter 503 comprises a spatially homogenous structure, such as when it comprises a birefringent material. The polarization splitter acts as a combiner when signals of different polarization impinge on the output side, communicating the combined signal out of the input side shown in FIG. 6. The polarization rotator 515 may comprise a half-wave plate rotator for a 45 degree polarization rotation, for example. In another example embodiment, the outputs of the polarization splitter may be rotated by different amounts in order to equalize their polarizations after the rotator.

The CWDM coating may comprise a stack of thin films on an angled plane in or on the prism 505 that are configured to reflect signal of a desired wavelength and allow others to pass. An example high pass spectrum is shown in FIG. 5 in the lower left plot, where CWDM bands 3 and 4 are transmitted through the CWDM coating 507 while the CWDM bands 1 and 2 are reflected downward to the photonics die 513 via the lens array 511, which may focus the signals onto corresponding grating couplers.

Signals that pass through the CWDM coating 507 may then be reflected by the HR coating 509, which comprises a high reflectivity coating, such as a metal for example, formed on an angled plane of the prism 505. The reflected signals may be focused by the lens array 511 onto corresponding grating couplers in the photonics die 513.

Figure 6:
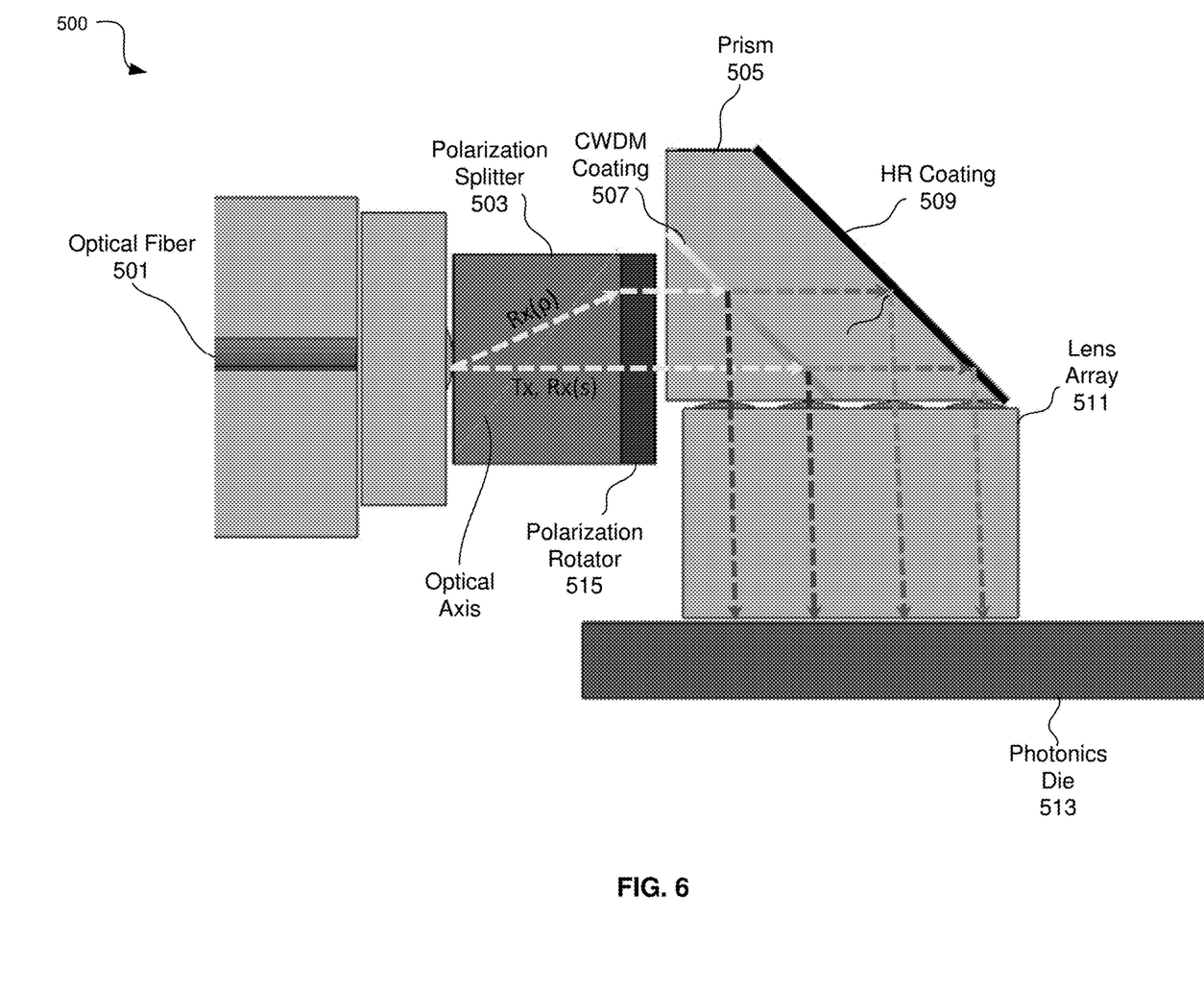
FIG. 6 illustrates a side view of an external multiplexer/demultiplexer, in accordance with an example embodiment of the disclosure.

FIG. 6 illustrates a side view of an external multiplexer/demultiplexer, in accordance with an example embodiment of the disclosure. Referring to FIG. 6, there is shown a side view of MUX/DEMUX 500 with optical fiber 501, polarization splitter 503, lens array 511, photonics die 513, polarization rotator 515, and prism 505 comprising CWDM coating 507 and HR coating 509, as described above with respect to FIG. 5. In addition, the optical axis of the polarization splitter 503 is indicated by the dashed line.

In this example, receive polarization diversity is handled with the external MUX/DEMUX 500 eliminating polarization dependent loss of CWDM filters and allows single polarization grating couplers in the photonics die 513 as opposed to polarization splitting grating couplers. The optical beam paths may be configured to maintain highest density, and the short throw distance of this structure allows the use of a birefringent rotator for the polarization splitter 503. In addition, the polarization rotator 515 may comprise a half wave plate 45 degree polarization rotator. In another example embodiment, the polarization rotator 515 may rotate the outputs of the polarization splitter by different amounts in order to equalize their polarizations after the polarization rotator 515.

The beam paths for the different wavelengths and polarizations are shown by the dashed lines, where the longer wavelength signals pass through the CWDM coating 507 and are reflected down to the lens array 511 by the HR coating 509. In addition, the birefringent material, in this example, in the polarization splitter 503 deflects the p-polarization signals upward to impinge on the CWDM coating 507 at a higher location than the s-polarization signals that pass straight through. This same process works in reverse for signals coming from the photonics die 513. In this manner, with polarization control and spatial separation, single polarization grating couplers may be used in the photonics die 513 independent of the polarization.

In an example scenario, a ~45 degree angle-of-incidence (AOI) design significantly lowers throw distances, which can be leveraged to increase areal channel density. For instance, a fiber spacing of 127 µm between Tx and Rx can be readily achieved. The simple high-pass spectral response minimizes issues with angle sensitivity of a 45 degree AOI filter. A single reflection from a filter also greatly lowers impact of filter warpage, compared to cumulative angle error seen after multiple bounces in a conventional Z-block design. This allows for easier scaling to accommodate much larger fiber counts in the same filter piece. Furthermore, optical beams also go through the filter once, which minimizes accrual of insertion loss that would be seen for last dropped channel in a 4-channel CWDM4 DEMUX. Finally, the HR coating 509 can be implemented on the back-side of the WDM filter to get good control over spacing of the two sets of reflected beams.

Figure 7:
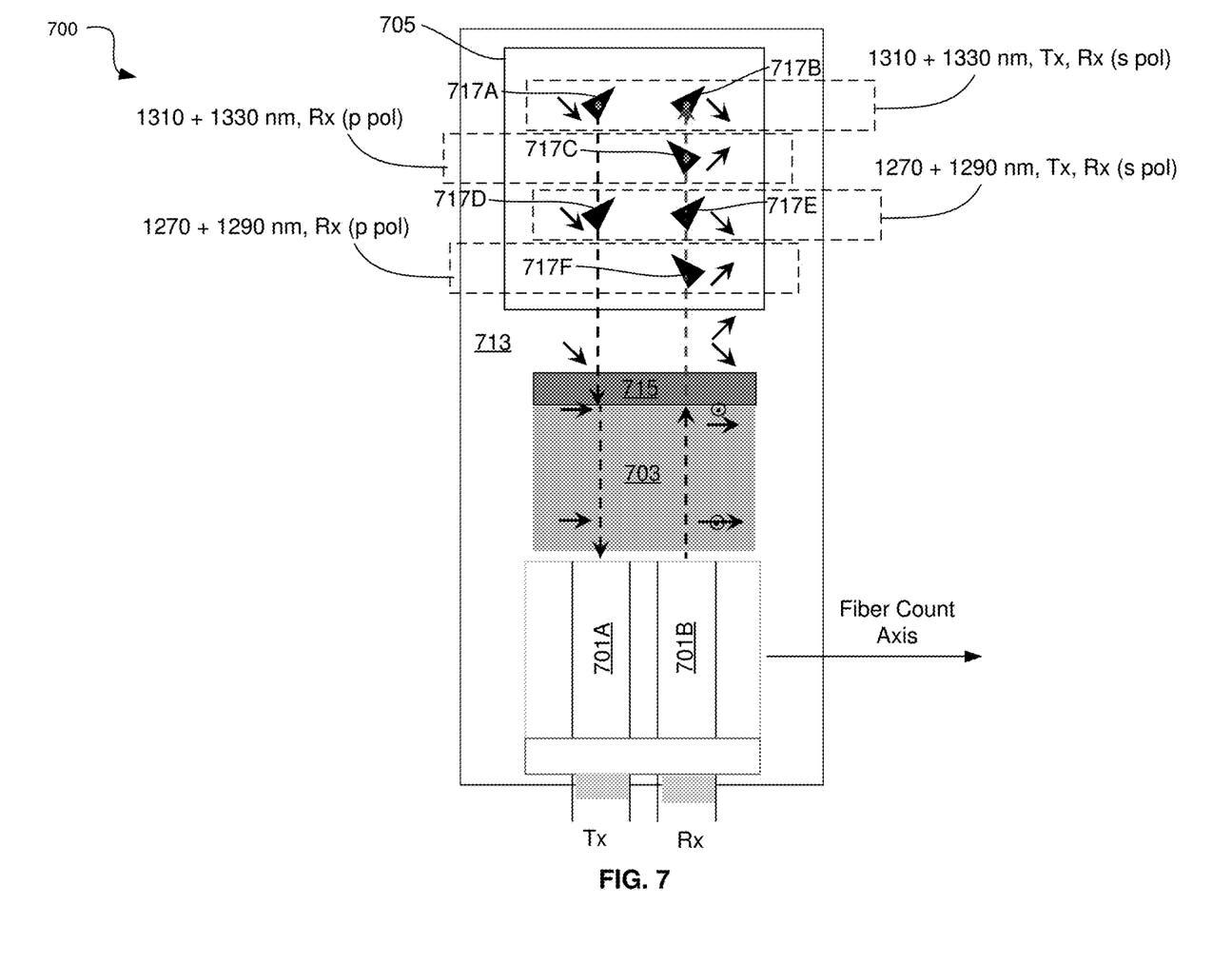
FIG. 7 illustrates a top view and beam paths of an external multiplexer/demultiplexer, in accordance with an example embodiment of the disclosure.

FIG. 7 illustrates a top view and beam paths of an external multiplexer/demultiplexer, in accordance with an example embodiment of the disclosure. Referring to FIG. 7, there is shown a top view of MUX/DEMUX 700 with optical fibers 701A and 701B, polarization splitter 703, photonics die 713, and polarization rotator 715, grating couplers 717A-717F, and prism 705 comprising CWDM coating 507 and HR coating 509, as described above with respect to FIG. 5.

The MUX/DEMUX 700 demonstrates "spatially homogenous" polarization splitting in that there is no fine alignment feature in the separator/rotator 703/715, so scaling along the fiber count axis is simplified, with a simple extrusion of material along the axis. In addition, the polarization separation does not create a vacant position in the fiber array.

As can be seen in FIG. 7, different wavelength and different polarization signals are communicated via different grating couplers 717A-7171F. In the example shown, coupler 717A communicates 1310 and 1330 nm Tx optical signals into fiber 701A via the prism 705, rotator 715, and polarization splitter 703 while coupler 717B couples 1270 and 1290 nm Tx optical signals into fiber 701A via the prism 705, rotator 715, and polarization splitter 703. The 1310/1330 nm and 1270/1290 nm optical signals may be multiplexed by on-chip multiplexers in the silicon interposer 713, such as the multiplexer/demultiplexer 1100 described in FIG. 11. In this manner, single polarization grating couplers may be used in the transceiver, which results in lower loss. However, polarization-combining grating couplers may also be used in place of the single polarization grating couplers shown.

Figure 11:
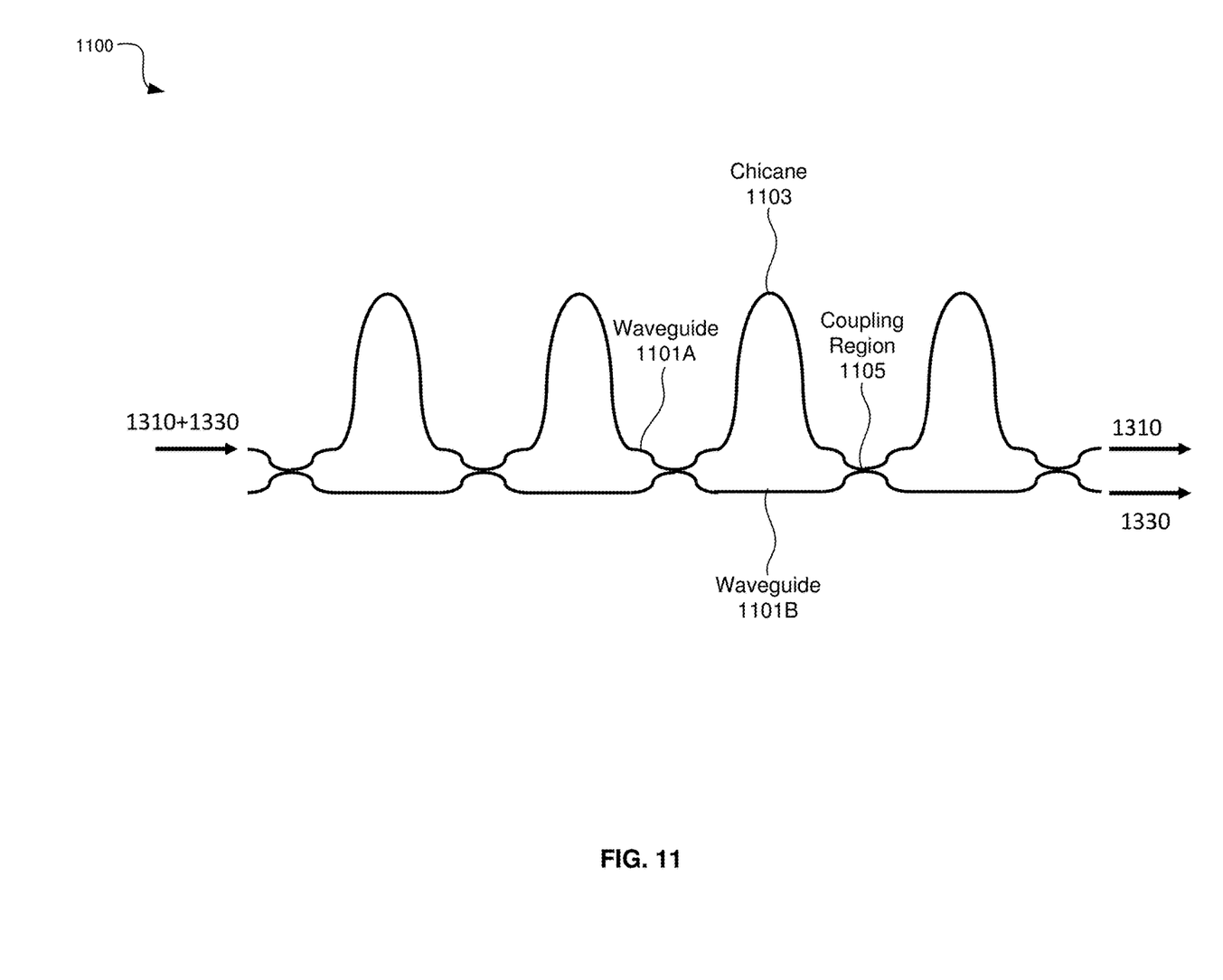
FIG. 11 illustrates an on-chip two-channel multiplexer/demultiplexer, in accordance with an example embodiment of the disclosure.

Furthermore, the grating couplers 717B, 717E, and 717F may receive optical signals from the prism 705 and couple them to on-chip demultiplexers, such as the multiplexer/demultiplexer 1100 described in FIG. 11.

Figure 8:
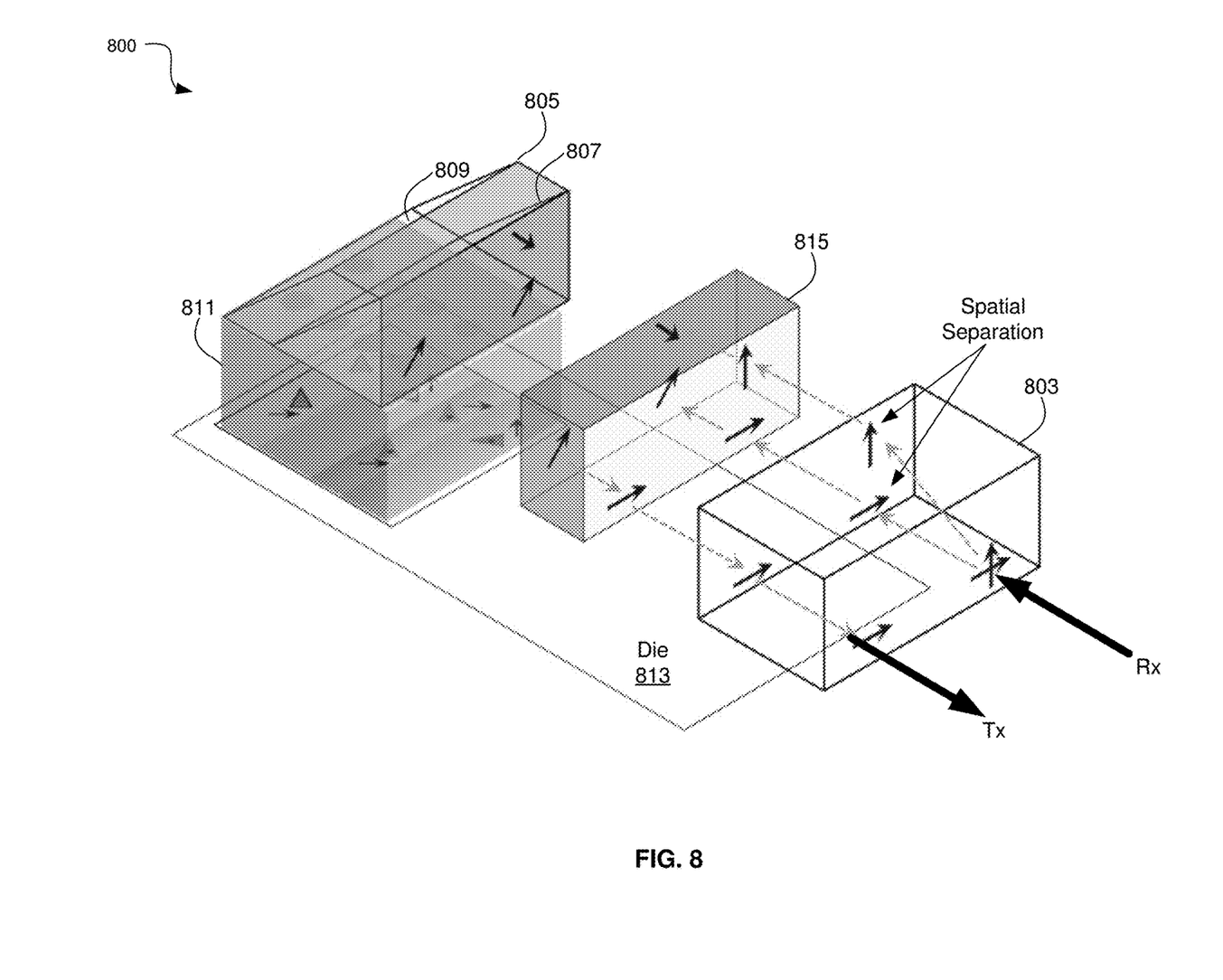
FIG. 8 illustrates an isometric view of the external multiplexer/demultiplexer, in accordance with an example embodiment of the disclosure.

FIG. 8 illustrates an isometric view of the external multiplexer/demultiplexer, in accordance with an example embodiment of the disclosure. Referring to FIG. 8, there is shown an oblique angle view of MUX/DEMUX 800 with polarization splitter 803, lens array 811, photonics die 813, polarization rotator 815, and prism 805 comprising CWDM coating 807 and HR coating 809, similar to those described above with respect to FIG. 5. FIG. 8 also shows the polarization of optical signals at various points in the MUX/DEMUX 800, as indicated by the short arrows.

The birefringent crystal in the polarization splitter 803 creates vertical separation between Rx (from the fiber) s- and p-polarizations as shown in the Rx path at the back surface of the polarization splitter 803 and at the front surface of the half-wave plate of the polarization rotator 815. FIG. 8 also illustrates the laterally separated Tx and Rx paths. This illustrates the expandability of the structure, in that more fibers can be incorporated laterally, thereby adding more channels, as shown in FIG. 9.

Figure 9:
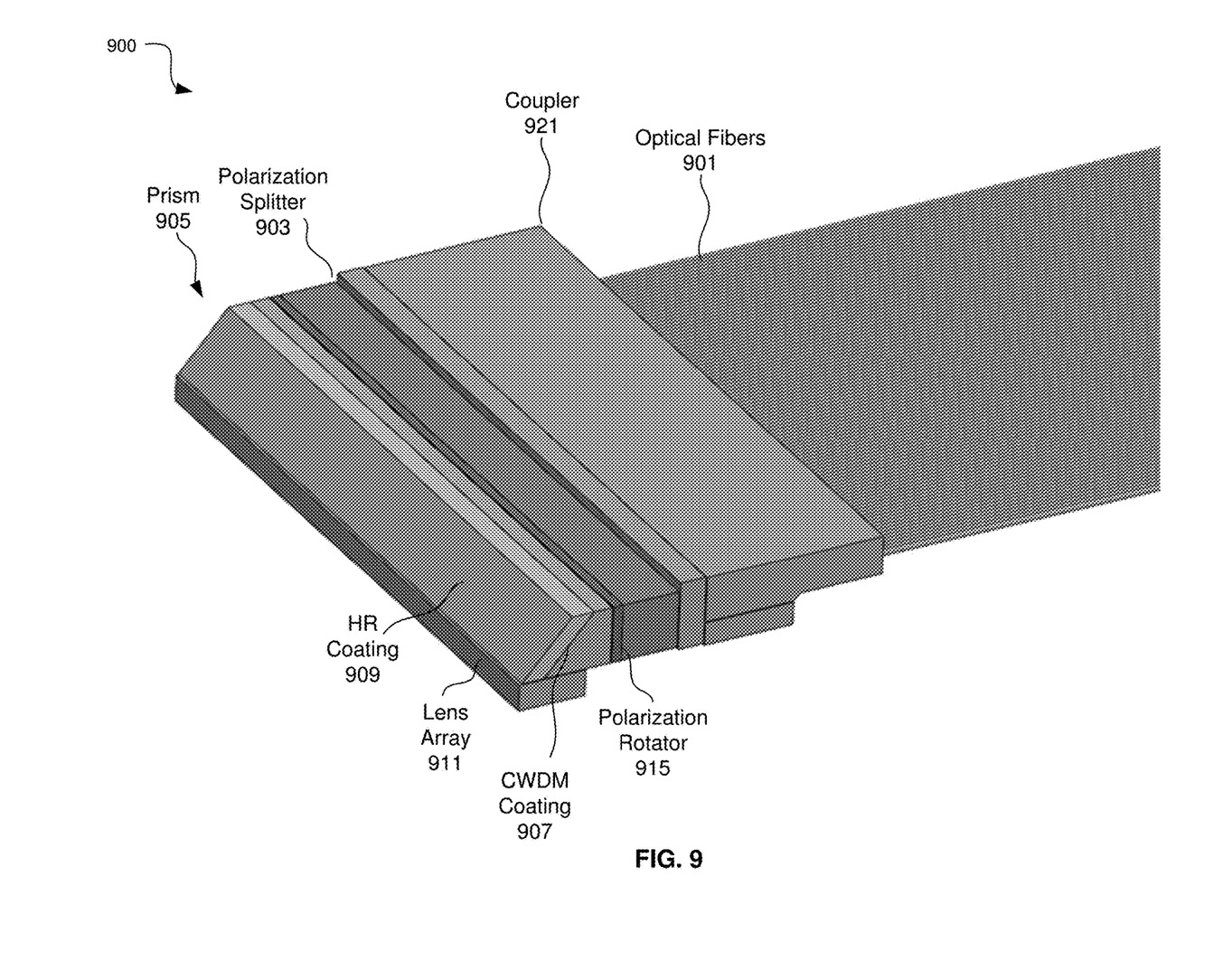
FIG. 9 illustrates the scaling capability of an external multiplexer/demultiplexer, in accordance with an example embodiment of the disclosure.

FIG. 9 illustrates the scaling capability of an external multiplexer/demultiplexer, in accordance with an example embodiment of the disclosure. Referring to FIG. 9, there is shown an oblique angle view of a MUX/DEMUX 900 with optical fibers 901, polarization splitter 903, lens array 911, polarization rotator 915, and prism 905 comprising CWDM coating 907 and HR coating 909, each similar to similarly named elements as described above with respect to FIG. 5. There is also shown a coupler 921 for providing physical/mechanical support for the array of optical fibers 901.

The distributed MUX/DEMUX design described here enables scaling to high channel counts since the external MUX/DEMUX functionality can be readily extruded along fiber-count axis as shown. In an example embodiment, a 64 fiber solution supporting 32 4×100 G transceivers is shown in FIG. 9.

Figure 10:
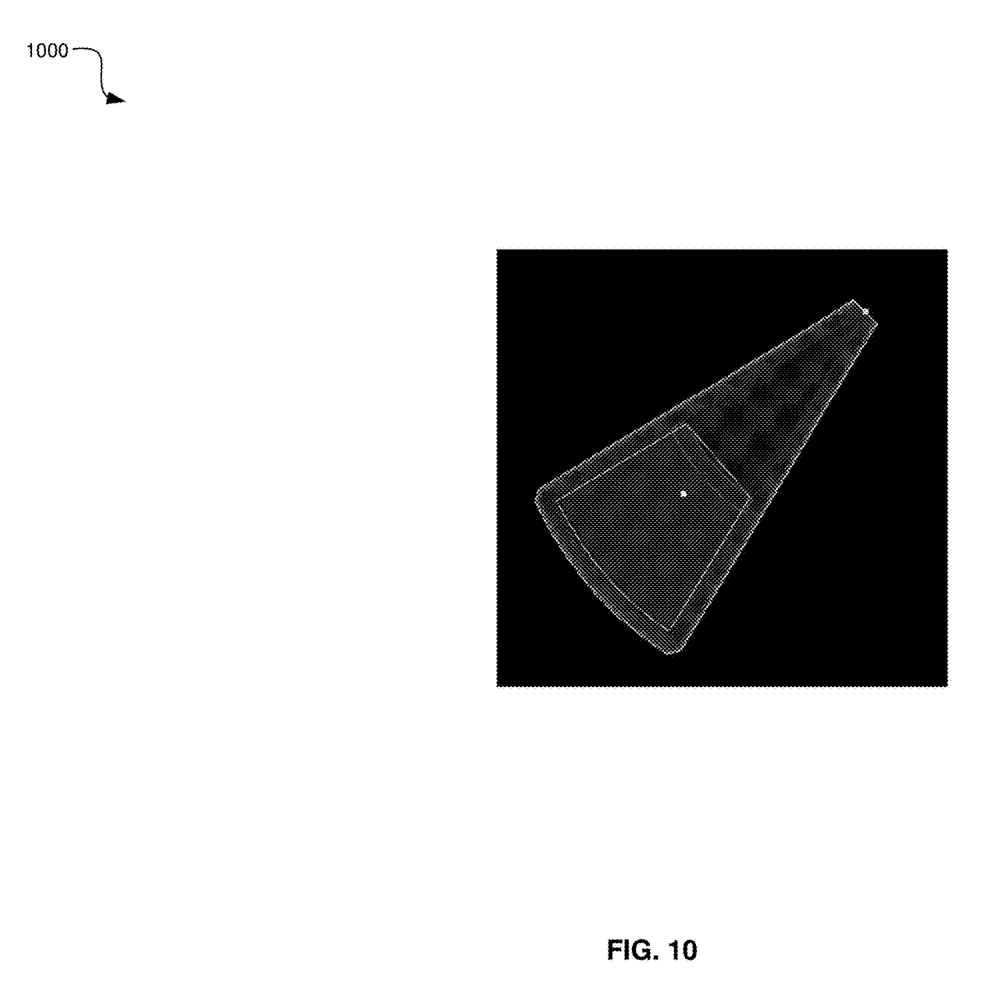
FIG. 10 illustrates a broadband angled fiber grating coupler, in accordance with an example embodiment of the disclosure.

FIG. 10 illustrates a broadband angled fiber grating coupler, in accordance with an example embodiment of the disclosure. Referring to FIG. 10, there is shown a broadband grating coupler 1000 with 40 nm 1 dB bandwidth that is a single-polarization grating coupler, which may be employed on both Tx and Rx sides of the transceivers shown in FIGS. 1-9. The grating coupler 1000 comprises an array of curved gratings in a photonics die where the change of index from silicon to silicon dioxide, nitride, or air, for example, provide scattering of optical signals such that light impinging from a vertical direction is scattered into the plane of the photonics chip. The external polarization splitting described above allows for the elimination of more complex polarization splitting grating couplers on the Rx side, which makes design of broadband grating couplers more tenable. The single polarization is +/−45 deg, which enables scalability of a high density external MUX/DEMUX design.

FIG. 11 illustrates an on-chip two-channel multiplexer/demultiplexer, in accordance with an example embodiment of the disclosure. Referring to FIG. 11 there is shown MUX/DEMUX 1100 with a pair of waveguides 1101A and 1101B with intermittent coupling regions 1105 where they become close enough for optical coupling. In addition one of the waveguides has "chicanes" 1103 or extended lengths for providing a phase shift for optical signals in that path. Further phase modulation may be enabled by PN junctions placed along the waveguides where a bias on the PN junctions cause an index of refraction change and thus a phase change for optical signals passing through.

In the example shown in FIG. 11, MZI lattice filters are employed for the MUX/DEMUX functionality, where 4th order filters are shown. These structures may also be used as clean-up filters with correct free spectral range (FSR) selection. In demonstrated MUX/DEMUX structures fabricated in silicon, the correct phase were set at a calibration step using low-speed phase-modulators (LSPM) and a look-up table for LSPM settings can also be implemented.

In this embodiment a multiplexed optical signal of different wavelengths, 1310 and 1330 nm in this example, is coupled into one input of the MUX/DEMUX 1100 and the 1310 nm signal is output from output waveguide 1101A while the 1330 nm signal is output from the other output waveguide 1101B. The MUX/DEMUX 1100 operates as either a multiplexer or multiplexer, where FIG. 11 shows it operating as a demultiplexer, but operates as a multiplexer by coupling 1310 and 1330 nm input signals at both waveguides 1101A and 1101B at one end and outputting the multiplexed 1310/1330 optical signal out of one waveguide 1101A or 1101B at the opposite end.

In an example embodiment of the disclosure, a method and system are described for CWDM MUX/DEMUX designs for silicon photonics interposers. The method and system may comprise an optical transceiver comprising a silicon photonics interposer, a polarization splitter, a lens array, and a prism with a coarse wavelength division multiplexing (CWDM) coating and a high reflectivity (HR) coating, with the polarization splitter, lens array, and prism being coupled to the silicon photonics interposer. An input optical signal comprising a plurality of different wavelength and a plurality of different polarization optical signals may be received. Signals of different polarization may be spatially separated using the polarization splitter and signals of a first wavelength range may be reflected into the lens array using the CWDM coating while signals in a second wavelength range may be passed through the CWDM coating.

Signals of the second wavelength range may be reflected to the lens array using the HR coating, and optical signals may be coupled into the silicon photonics interposer using the lens array. Signals of two different wavelengths in the first wavelength range and signals of two different wavelengths in the second wavelength range may be demultiplexed using demultiplexers in the silicon photonics interposer.

A polarization of signals may be rotated using a polarization rotator between the polarization splitter and the prism. The polarization of the signals may be rotated 45 degrees using the polarization rotator. Outputs of the polarization splitter may be rotated by different amounts in order to equalize their polarizations after the polarization rotator. Signals of four different wavelengths may be multiplexed into two output signals using two multiplexers in the silicon photonics interposer. The two output optical signals may be communicated out of the silicon photonics interposer into the prism via the lens array. The two output optical signals may be multiplexed into a single output signal using the HR coating, the CWDM coating, and the polarization splitter. The input optical signal may be received from one or more optical fibers. The polarization splitter may comprise a birefringent material or spatially separating and polarization-dependent thin film filters. The silicon photonic interposer may comprise a complementary metal oxide semiconductor (CMOS) die.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

While the present disclosure has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   in an optical device comprising a photonics interposer, a polarization splitter, a lens array, and a prism comprising a first coating and a second coating, where the polarization splitter, lens array, and prism are coupled to the photonics interposer:
   receiving an input optical signal comprising a plurality of different wavelengths and a plurality of different polarizations;
   spatially separating signals of different polarizations using the polarization splitter;
   reflecting signals of a first wavelength range into the lens array using the first coating while passing signals of a second wavelength range through the first coating;
   reflecting signals of the second wavelength range to the lens array using the second coating;
   coupling optical signals into the photonics interposer using the lens array; and
   demultiplexing signals of two different wavelengths in the first wavelength range and signals of two different wavelengths in the second wavelength range using demultiplexers in the photonics interposer.

2. The method according to claim 1, comprising rotating a polarization of signals using a polarization rotator between the polarization splitter and the prism.

3. The method according to claim 2, comprising rotating the polarization of the signals 45 degrees using the polarization rotator.

4. The method according to claim 2, comprising rotating outputs of the polarization splitter by different amounts to equalize their polarizations after the rotator.

5. The method according to claim 1, comprising multiplexing signals of four different wavelengths into two output signals using two multiplexers in the photonics interposer.

6. The method according to claim 5, comprising communicating the two output optical signals out of said photonics interposer into the prism via the lens array.

7. The method according to claim 5, comprising multiplexing the two output optical signals into a single output signal using the second coating, the first coating, and the polarization splitter.

8. The method according to claim 1, comprising receiving the input optical signal from one or more optical fibers.

9. The method according to claim 1, wherein the polarization splitter comprises a birefringent material.

10. The method according to claim 1, wherein the polarization splitter comprises spatially separating and polarization-dependent thin film filters.

11. The method according to claim 1, wherein the photonic interposer comprises a complementary metal oxide semiconductor (CMOS) die.

12. A system for communication, the system comprising:
   an optical device comprising a photonics interposer, a polarization splitter, a lens array, and a prism comprising a first coating and a second coating, where the polarization splitter, lens array, and prism are coupled to the silicon photonics interposer, the optical device being operable to:
   receive an input optical signal comprising a plurality of different wavelengths and a plurality of different polarizations;

spatially separate signals of different polarizations using the polarization splitter;

reflect signals of a first wavelength range into the lens array using the first coating while passing signals in a second wavelength range through the first coating;

reflect signals of the second wavelength range to the lens array using the second coating;

couple optical signals into the photonics interposer using the lens array; and demultiplex signals of two different wavelengths in the first wavelength range and signals of two different wavelengths in the second wavelength range using demultiplexers in the silicon photonics interposer.

13. The system according to claim 12, wherein the optical device is operable to rotate a polarization of signals using a polarization rotator between the polarization splitter and the prism.

14. The system according to claim 13, wherein the optical device is operable to rotate the polarization of the signals 45 degrees using the polarization rotator.

15. The system according to claim 13, wherein the optical device is operable to rotate outputs of the polarization splitter by different amounts in order to equalize their polarizations after the rotator.

16. The system according to claim 12, wherein the optical device is operable to multiplex signals of four different wavelengths into two output signals using two multiplexers in the photonics interposer.

17. The system according to claim 16, wherein the optical device is operable to communicate the two output optical signals out of said photonics interposer into the prism via the lens array.

18. The system according to claim 15, wherein the optical device is operable to multiplex the two output optical signals into a single output signal using the second coating, the first coating, and the polarization splitter.

19. The system according to claim 12, wherein the optical device is operable to receive the input optical signal from one or more optical fibers.

20. The system according to claim 12, wherein the polarization splitter comprises a birefringent material or spatially separating and polarization-dependent thin film filters.

21. The system according to claim 12, wherein the photonic interposer comprises a complementary metal oxide semiconductor (CMOS) die.

22. A system for communication, the system comprising:
an optical device comprising a photonics interposer, a polarization splitter, a lens array, and a prism comprising a first coating and a second coating, where the polarization splitter, lens array, and prism are coupled to the photonics interposer, the optical device being operable to:

multiplex signals of a first wavelength and a second wavelength into a first multiplexed signal using a first multiplexer in the photonic interposer;

multiplex signals of a third wavelength and a second wavelength into a second multiplexed signal using a second multiplexer in the photonic interposer;

couple the first and second multiplexed optical signals into the prism via the lens array;

reflect the first and second multiplexed optical signals into the polarization splitter;

multiplex the first and second multiplexed optical signals into a third multiplexed signal comprising optical signals of four different wavelengths; and communicate the third multiplexed signal into an optical fiber.

* * * * *

UNITED STATES PATENT AND TRADEMARK OFFICE
CERTIFICATE OF CORRECTION

PATENT NO. : 10,917,190 B2
APPLICATION NO. : 16/599698
DATED : February 9, 2021
INVENTOR(S) : Subal Sahni Page 1 of 1

It is certified that error appears in the above-identified patent and that said Letters Patent is hereby corrected as shown below:

In the Claims

In Column 12, Line 63, in Claim 12, delete "silicon photonics" and insert -- photonics --, therefor.

Signed and Sealed this
Eighth Day of June, 2021

Drew Hirshfeld
*Performing the Functions and Duties of the
Under Secretary of Commerce for Intellectual Property and
Director of the United States Patent and Trademark Office*